United States Patent [19]
Hanser

[11] 3,858,260
[45] Jan. 7, 1975

[54] AMPHIBIAN VEHICLE
[76] Inventor: Paul Edmond Hanser, 2329 33rd St., Moline, Ill. 61265
[22] Filed: Feb. 12, 1973
[21] Appl. No.: 331,553

[52] U.S. Cl. .................. 9/1 T, 280/414 A, 115/1 R
[51] Int. Cl. ............................................. B63c 13/00
[58] Field of Search ................. 9/1 T, 1 R; 114/44; 115/1 R, 1 A; 280/43.17, 43.18, 43.23, 150.5, 414 A; 244/102 R, 102 A

[56] References Cited
UNITED STATES PATENTS

| | | | |
|---|---|---|---|
| 2,041,616 | 5/1936 | Noell et al. | 280/43.17 |
| 2,437,135 | 3/1948 | Steinhoff et al. | 244/102 R |
| 2,784,424 | 3/1957 | Southerland | 9/1 T |
| 2,984,846 | 5/1961 | Maloney | 9/1 T |
| 2,991,750 | 7/1961 | Tourneau | 114/44 |
| 3,090,973 | 5/1963 | Levinson | 9/1 T |
| 3,436,095 | 4/1969 | Preston | 280/150.5 |
| 3,608,111 | 9/1971 | Herden | 9/1 T |
| 3,755,838 | 9/1973 | Dunagan | 9/1 T |

Primary Examiner—Trygve M. Blix
Assistant Examiner—Edward R. Kazenske
Attorney, Agent, or Firm—Thomas E. Frantz

[57] ABSTRACT

Two arms are mounted on an amphibian vehicle to pivot simultaneously in a vertical plane between inoperative and operative positions, a wheel or other support member used by the vehicle being movable with the arms between a retracted and an extended position. A link is journaled on and rotatable with the arms to both synchronize their movement and act as a wedge or truss strut which restrains the arms against rearward movement under the influence of vertical pressure on the extended wheel.

During movement toward their operative position, the arms pass through an intermediate position in which the longitudinal axes of one of the arms is aligned with that of the link, thus creating a "dead center" condition. There is provided a spring activated mechanism which automatically moves the arms and link through this intermediate position and into their operative positions.

10 Claims, 7 Drawing Figures

Patented Jan. 7, 1975

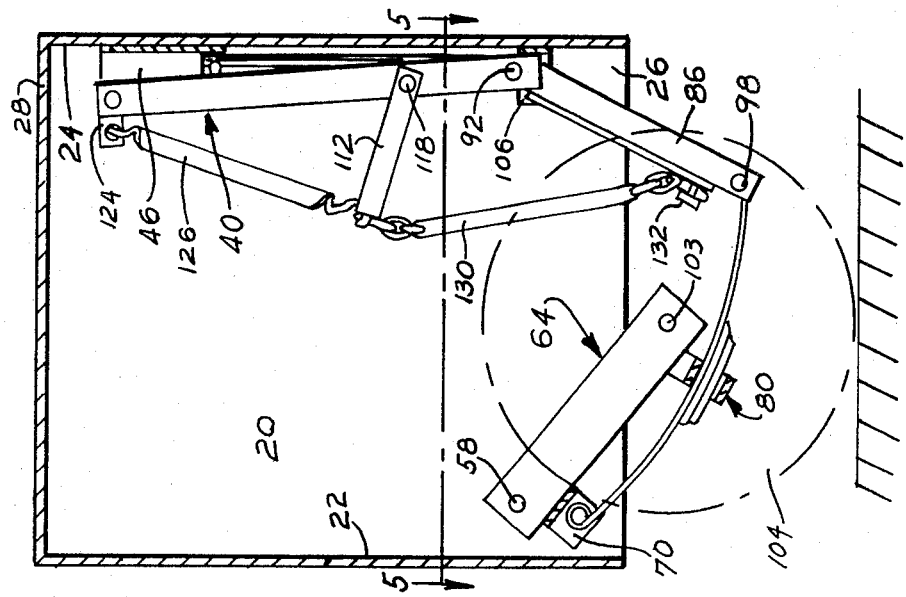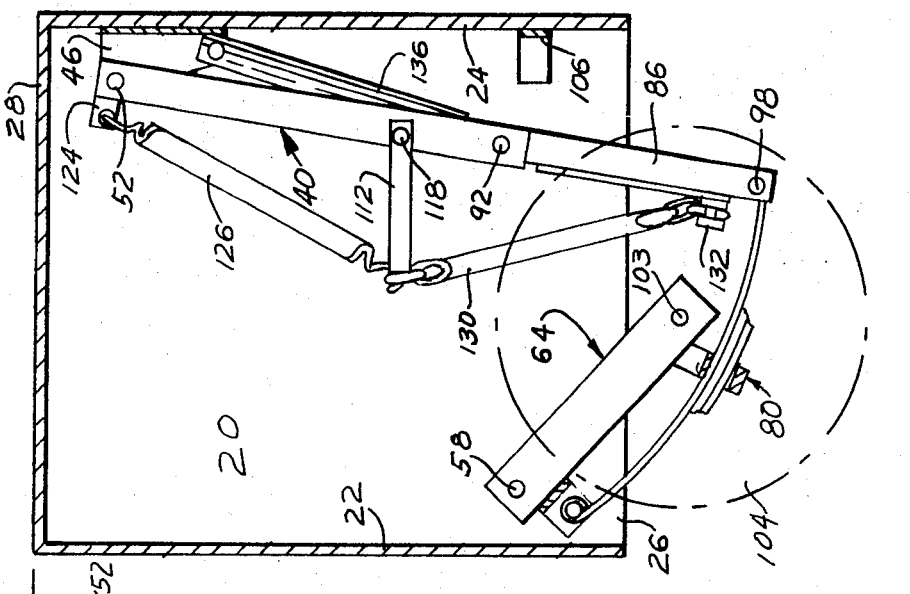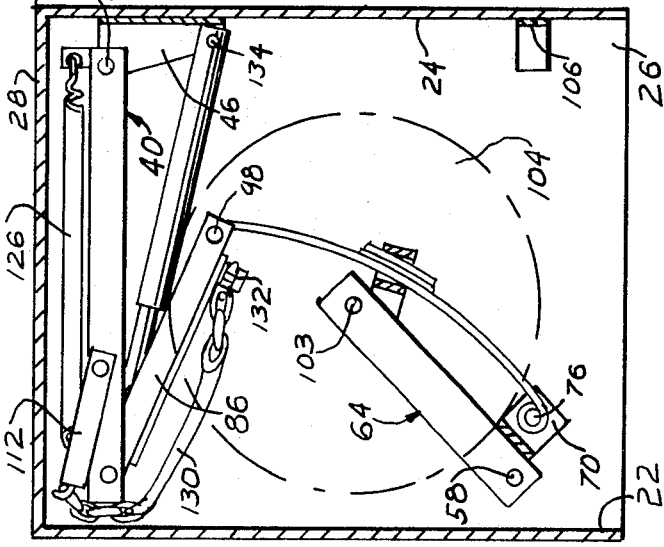

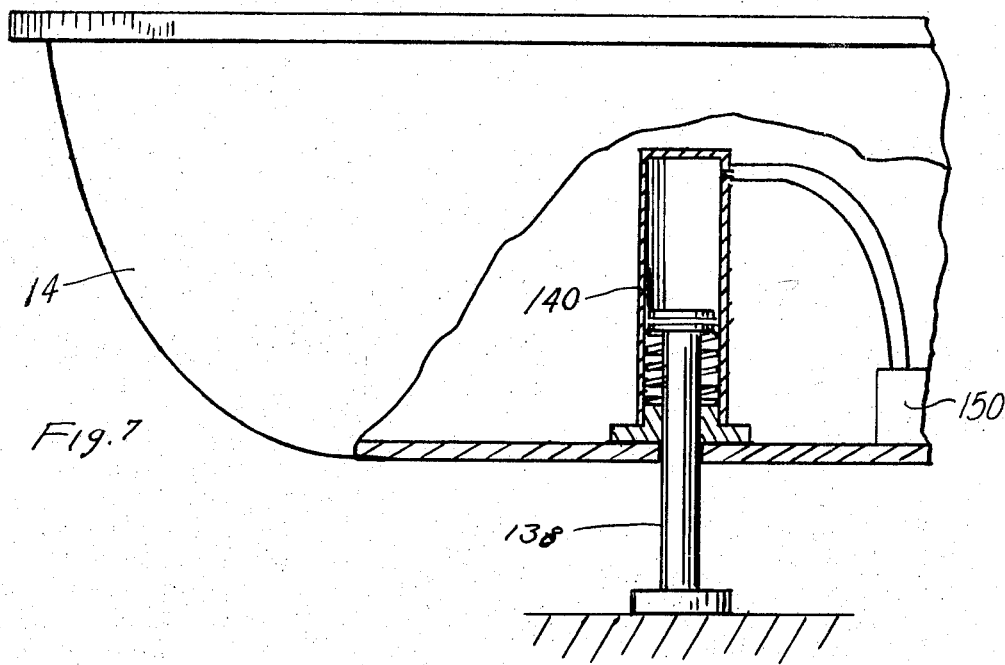
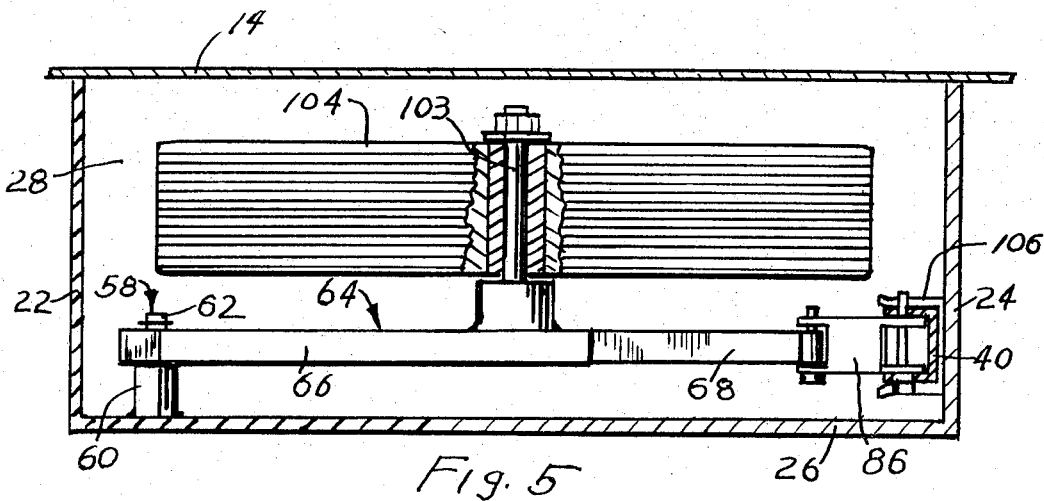

3,858,260

AMPHIBIAN VEHICLE

BACKGROUND OF THE INVENTION

1. FIELD OF THE INVENTION

The present invention relates to amphibian vehicles adapted to operate in or on more than one environment or surface, and more particularly to a water craft having integral wheels or other appropriate support members adapted to permit movement of the craft over land.

2. DESCRIPTION OF THE PRIOR ART

A number of attempts have been made in the past to provide a water craft with retractable wheels, thereby eliminating the need for, expense of and inconvenience associated with use and maintenance of a separate trailer. Unfortunately, such prior attempts have met with little or no success because of high initial cost, instability in use, inconvenient or unreliable operation, excessive maintenance, degradation in operation of the craft, or a combination of these or other factors.

Most such prior proposals, for example, require several different manual operations to raise or lower the wheels and to lock them in either of the desired positions.

SUMMARY OF THE INVENTION

It is a principal object of this invention to provide a novel amphibian vehicle having wheels which are easily and quickly reciprocated into and out of an extended position.

Another object of this invention is the provision of an amphibian vehicle having wheels which are extendable from and retractable into compartments provided on both sides of the hull or body.

Yet another object of this invention is to provide a water craft having wheels mounted on assemblies which are automatically locked and rigidly retained in an extended position by the weight of the craft, thereby eliminating the danger of inadvertent retraction.

A still further object of this invention is the provision of a wheel retracting mechanism which is readily modified in size for use with wide variety of vehicles.

Yet an additional object of the present invention is to provide a wheel retracting mechanism which is rugged yet not cumbersome, which is relatively inexpensive to manufacture, which will not adversely effect the operation of the vehicle on which used either in water or on land, and which is exceedingly simple and convenient to operate. These and other objects of the present invention will become even more apparent from the following description taken in conjunction with the accompanying drawings which illustrate a preferred embodiment thereof.

The present invention provides an improved assembly for moving a wheel or other appropriate support member of an amphibian vehicle between a retracted or concealed position within the hull of the vehicle and an extended position projecting below the vehicle for engagement with the ground. Included in the assembly is a pair of arms mounted on the vehicle for pivotal movement in a vertical plane between upper and lower positions, with a link being journaled on the arms to synchronize the movement thereof between these positions. As the arms simultaneously approach their lower position, the link is rotated into a wedging position therebetween to form a truss strut capable of maintaining the arms in their extended position and the wheel in a projected position under the pressure created by any practical load in the vehicle.

A power unit is connected to and biased relative to the circular arc of rotation of one of the arms such that operation of the unit sequentially causes the link to rotate out of its wedging position and the arms to rotate to their inoperative position, thereby retracting the wheel.

BRIEF DESCRIPTION OF THE DRAWINGS

In the drawings:

FIG. 2 is an enlarged vertical sectional view of the compartments incorporated in the vehicle of FIG. 1, with the wheel assembly shown in retracted position;

FIG. 3 is a view similar to that of FIG. 2, with the wheel assembly shown in an intermediate position;

FIG. 4 is a view similar to that of FIG. 2, with the wheel assembly shown in extended position;

FIG. 5 is a sectional view taken substantially on line 5—5 in FIG. 4;

FIG. 7 is an enlarged fragmentary, partially sectional view of the bow of the vehicle of FIG. 1, showing the adjusting member used for leveling the vehicle.

DESCRIPTION OF THE PREFERRED EMBODIMENT

Figure 1:
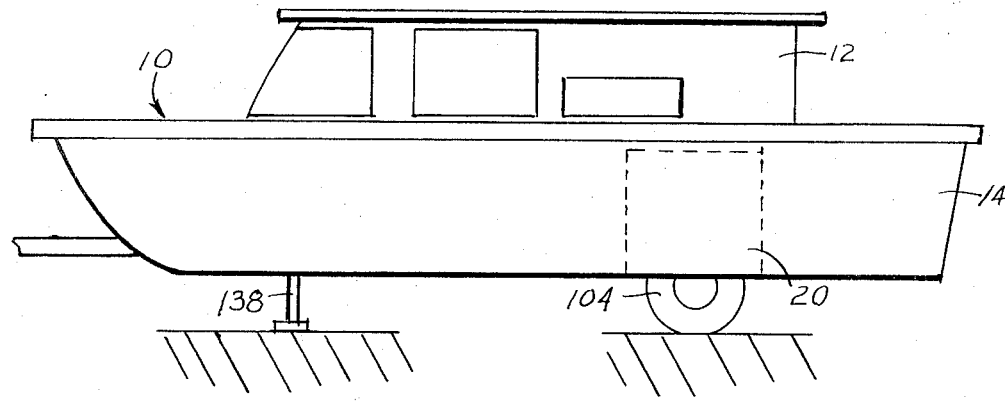
FIG. 1 is a side elevational view of an amphibian vehicle embodying one form of the present invention, with the wheel assembly shown in an extended position.

Continuing now with a more detailed description of the preferred embodiment, reference is first made to FIG. 1, showing the amphibian vehicle 10 as taking the general form of a conventional boat or water craft having a cabin 12. Preferably, the hull 14 is formed of steel sheet of fiberglass, or a combination thereof, but it will be understood that other suitable materials may be used.

Formed within the hull 14 adjacent each side thereof is a substantially water-tight wheel compartment 20. The forward and rearward end walls 22 and 24, inner wall 26 and top surface 28 of the compartment preferably are formed of steel sheet and welded or otherwise affixed to the inner side of the hull. Thus, the hull 14 forms the exterior wall of the compartment.

As will be best seen in FIGS. 2, 3 and 4, compartment 20 opens downwardly through the bottom of hull 14 to provide for the movement of wheel 104 between the illustrated positions.

An assembly is provided in each compartment 20 for moving the wheel 104 in a vertical plane extending substantially parallel with the longitudinal axis of the hull 14. The general configuration of the more important parts of this assembly are shown best in FIG. 6.

This assembly includes a generally channel shaped first arm 40 having side rails 42 and a top plate 44, which plate stops short of the forward end of the arm.

Welded or otherwise affixed close to the top or rearward wall 24 is a first support or pivot mount 46 formed by a back plate 48 and tapered sides 50. The spacing between sides 50 in such that they readily fit between the side rails 42 of the arm 40.

A pin 52 extends through apertures 54 in side rails 42 and apertures 56 in tapered sides 50 to journal the inner end of arm 40 on the first support 46. The other or outer end of arm 40 thus is free to oscillate or rotate around pin 52 between an upper position extending generally horizontally from the support 46 to a lower position depending generally vertically from the support.

Bolted or otherwise securely affixed to inner wall 26 is a second support 58 which includes an enlarged shoulder portion 60 and a reduced axle portion 62. It will be noted that axle portion 62 and pin 52 are generally parallel to one another.

A second arm 64 is journaled at its inner end on support 58, the outer end of this arm being free to oscillate or rotate around the support.

Depending upon the weight of the vehicle 10, the degree of "softness" desired in its ride, the roughness of the terrain over which the vehicle is to be moved, cost considerations and various other factors, the basic structure of arm 64 may be varied widely. For example, in a light weight or inexpensive vehicle or one in which "ride" is not a factor, arm 64 may take the form of a simple one piece beam such as that employed in arm 40. Alternately, arm 64 could be made as a complex assemblage of springs, shock absorbers and other ride "controlling" devices.

In the present embodiment, however, the second arm includes two major elements — an axle support bar 66 and a leaf spring 68.

The inner ends of the leaf spring and axle support 66 are operatively coupled by a connector 70 which is carried adjacent the inner end of support 66 and provided with arms 72 which are spaced apart for reception of the curved end 74 of spring 68. A pin 76 is disposed in apertures 78 in arms 72 and through the curved end 74 of spring 68.

The outer end of axle support 66 is operatively coupled with leaf spring 68 by a bracket 80. Bracket 80 includes a pair of side legs 82 fixed to support 66 and extending downwardly therefrom to a position slightly below the lower leaf of spring 68. Extending transversely between legs 82 are two spaced wall portions 84, one of which is disposed on each side of the leaf spring. These wall portions 84 thus cooperate with side legs 82 to define an aperture 85 through which the leaf spring extends. The fit between spring 68 and aperture 85 should be relatively loose for a purpose which will be mentioned hereinafter.

Figure 6:
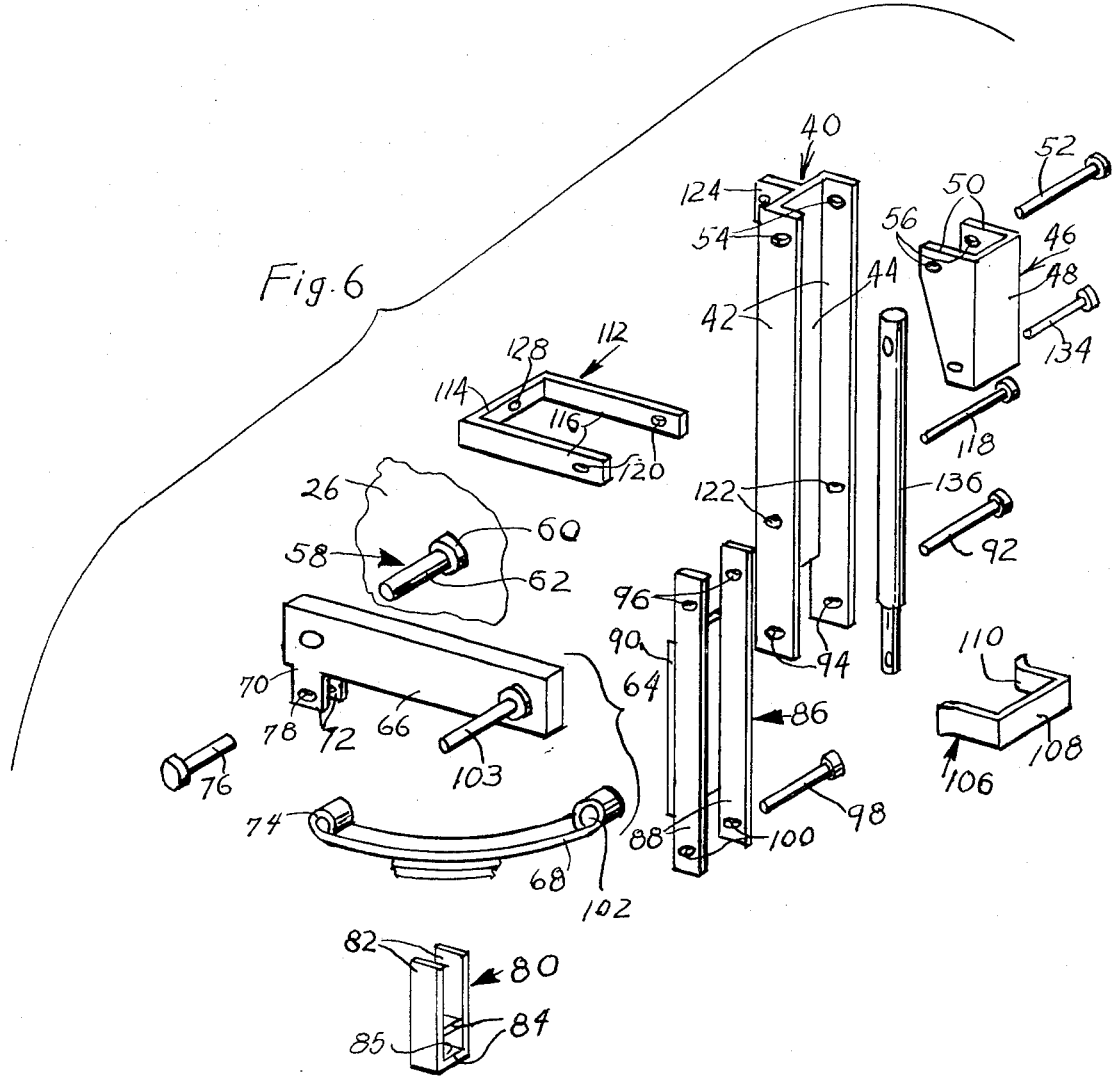
FIG. 6 is an exploded perspective of some of the principal elements in the wheel assembly.

A link 86 is formed by a pair of parallel side rails 88 and a top plate 90. As can be seen in FIG. 6, this top plate 90 terminates short of the ends of the side rails 88.

The spacing between side rails 88 is such that one end of the link 86 will fit between side rails 42 of the first arm 40, and the other end will fit over the outer end of leaf spring 68. Thus, pivot pin 92 may be inserted through apertures 94 in side rails 42 and apertures 96 in side rails 88 to journal one end of the link 86 on the outer end of first arm 40. Pivot pin 98 may then be inserted through apertures 100 in rails 88 and the curved end 102 of spring 68 to journal the other end of the link 86 on the outer end of second arm 64.

Extending transversely from the outer end of axle support 66 is an axle 103 which is adapted to receive and rotatably support a wheel 104.

As will be seen readily from FIGS. 2, 3 and 4, arms 40 and 64 and link 86 are movable simultaneously as a unit between the three positions illustrated. FIG. 2 shows the parts in an upper or inoperative position, in which the first arm 40 extends forwardly in the compartment 20 substantially horizontally from the first support 46, the second arm 64 extends rearwardly in the compartment in an upwardly biased direction from support 58, the link 86 is disposed in a biased position between the ends of the arms, and the wheel 104 is in a retracted position within compartment 20.

FIG. 3 illustrates the same parts as rotated around their respective centers of rotation into an intermediate position. In this position, the arm 64 is biased downwardly from support 58, arm 40 and link 86 are aligned and the wheel 104 is projected a maximum distance out of compartment 20. In this position the parts might be considered as being on "dead center" since some externally applied force is required to move the parts in either direction.

FIG. 4 illustrates the parts as rotated out of the above mentioned dead center position and into an operative position wherein the wheel 104 is maintained in an extended position to support the vehicle 10 for movement over the ground. In this position, the first arm 40 is held in engagement with fixed stop means 106 mounted in compartment 20 on rearward wall 24 below support 46. Stop means 106 consists of a generally U shaped bracket having a back portion 108 affixed to wall 24, and a pair of spaced leg portions 110 which are spaced apart sufficiently to receive arm 40 therebetween. Preferably, the outer portion of the legs are flared outwardly to assist in centering arm 40 as it moves into engagement with the back 108.

Referring again to FIG. 4, it will be noted that link 86 has been rotated into an angular position between pivots 92 and 98 to form, in effect, a truss strut wedged between the pivots to prevent movement of arm 40 away from the stop 106 or upward movement of arm 64 under the influence of pressure exerted upwardly against wheel 104.

Upon movement of the vehicle 10 over a surface, such as a road, highway, field, or the like, it will be understood that the weight of the vehicle will cause flexure of the leaf spring 68 in a vertical direction, and concomitant reciprocation of axle support 66. As a result of such flexure of the spring 68, some transverse movement will occur between spring 68 and aperture 85 in bracket 80. Thus, as pointed out hereinabove, aperture 85 should be slightly larger than that portion of spring 68 which it surrounds so as to permit sliding movement therebetween.

Referring once again to FIGS. 2, 3 and 4 of the drawings, it will be noted that a lever 112 is pivoted at one end on arm 40 for movement thereon between a folded position disposed against the arm and an erect position generally perpendicular to the arm. Lever 112 is of a generally U shaped configuration, having an outer web 114 and a pair of legs 116 which are spaced apart sufficiently to straddle arm 40. Pivot pin 118 is mounted in apertures 120 in lever 112 and apertures 122 in the side rails 42 to maintain the lever 112 and arm 40 in an assembled relationship.

Positioned at the rearward end of arm 40 is a mount member 124 adapted to receive one end of a coil spring 126. The other end of coil spring 126 has an open loop which is inserted through aperture 128 in the outer end of lever 112. Extending in the opposite direction from the outer end of lever 112 is a chain 130, one end of the chain being hooked over the exposed portion of the open spring loop, with the other end being fixed to the link by a bolt 132.

As the arms 40 and 64 and link 86 move away from the upper inoperative position illustrated in FIG. 2, and approach the intermediate position shown in FIG. 3, the chain 130 and coil spring 126 act against the outer end of and rotate lever 112 from its folded position to its erect position to bias the spring and lever away from the arm. Such biasing action creates a significant amount of resilient force against lever 112 and this force, in turn, urges arm 40 and link 86 beyond the dead center position and into the operative position illustrated in FIG. 4. In this position, as mentioned earlier, the link 86 is wedged between pivots 92 and 98 to restrain movement of either arm away from its extended operative position even though substantial force should be exerted on the wheel 104.

Provided on pivot mount 46 is a second axle 134 disposed below the first support 52. This second axle is located at a point outside of the circular arc which is defined by the rotative movement of first arm 40.

Pivotally mounted on axle 134 is one end of an extendable and retractable power unit 136, such as an hydraulic cylinder. The other end of the power unit is pivoted on pin 92 which comprises the pivot between arm 40 and link 86.

When the arms 40 and 64 are in their lower operative position, actuation of the power unit will force arm 40 away from stop means 106 to rotate link 86 out of wedging engagement between pivots 92 and 98 and move the arms and link as a unit to their inoperative position. Such movement, of course, will move wheel 104 from its extended position to a retracted position within compartment 20.

Referring particularly to FIGS. 1 and 7, it will be noted that the bow of the vehicle is provided with an adjusting member 138 which is extendable and retractable in a vertical direction to level the vehicle or otherwise change its orientation relative to the ground.

This adjusting member comprises a double acting power unit 140, such as an hydraulic cylinder, which will move the adjusting member 138 in either direction and maintain it in any desired position.

The hydraulic cylinder 136 provided with each wheel retracting assembly and the cylinder 140 provided for the adjusting member 138 may be operated from a central power source 150, such as an hydraulic pump, or the like.

Actuation of the power source and subsequent operation of the power unit 136 and/or power unit 140 is selectively controlled by a control assembly provided on the vehicle at a location remote from either the power units or power source.

It is understood that the foregoing description is illustrative only, and is not intended in any way to limit the invention. Also, it is understood that numerous modifications and changes will readily occur to those skilled in the art and, therefore, it is neither desired nor intended to limit the invention to the embodiment shown and described hereinbefore.

I claim:

1. In an amphibian vehicle having a hull, at least one compartment disposed within th hull and opening through the bottom thereof, a wheel movable vertically relative to the compartment between a retracted position disposed in the compartment and an extended position projecting below the hull for engagement with the ground, and an assembly within the compartment and carrying the wheel, the assembly being selectively operable to move the wheel between and maintain the wheel in its projected and extended positions, said assembly being characterized by A. first and second fixed supports mounted in the compartment in a generally coplanar spaced relation, B. first and second arms journaled at their inner ends on said first and second supports, respectively, for pivotal movement in a vertical plane between an upper inoperative position and a lower operative position, C. a pivot carried at the outer end of each of said arms, D. a link having its end journaled on said pivots, said link
   1. maintaining said pivots at a substantially constant center to center distance, and
   2. rotating to an angular position relative to and between said arms and wedging between said pivots upon terminal movement of said arms into their operative position to restrain said arms against movement toward their inoperative position under the influence of upward pressure on said wheel, E. fixed stop means mounted in said compartment spaced from and generally coplanar with said supports, said stop means engaging said first arm and restraining said first arm from movement past its operative position under the influence of said pressure transmitted thereto from said second arm through said wedged link, F. said arms passing through an intermediate position during their movement between said inoperative and operative positions, said intermediate position being defined by
   1. projection of said second arm beyond its operative position, and
   2. alignment of the longitudinal axis of said first arm with the longitudinal axis of said link, G. a lever mounted on said first arm and extending generally transversely thereof when said first arm is in its intermediate position, H. pressure means acting against said lever in a direction to force said first arm from its intermediate position to its operative position and simultaneously move
   1. said second arm from its projected to its operative position, and
   2. said link from its aligned to its wedging position, and I. means selectively operable for rotating said link out of said angularly wedged position and moving said arms simultaneously from their operative position to their inoperative position, J. said wheel being carried by and movable simultaneously with said second arm between said retracted and extended positions in response to movement of said second arm between its inoperative and operative positions.

2. An assembly according to claim 1, characterized by

A. said lever being pivotally movable on said first arm,

B. a transversely flexible but longitudinally inelastic spacer connected to said link and the outer end of said lever, C. said pressure means comprising a tensioned coil spring connected to the inner end of said first arm and the outer end of said lever, D. said spacer and said spring simultaneously acting on said lever to sequently
  1. rotate said lever on said first arm from a position substantially overlying said arm to said transversely extending position during movement of said arm from its inoperative to its intermediate position, and
  2. move said lever toward said stop means and said first arm past said intermediate position into said operative positive.

3. An assembly according to claim 1 characterized by
A. said second arm including
  1. an axle support on which said wheel is carried, the inner end of said support being mounted for pivotal movement around said second fixed support, and
  2. a resilient leaf spring carrying the pivot which is journaled to said link, said spring being flexible in a direction substantially perpendicular to the longitudinal axis of said second arm,
  3. the outer end of said axle support being connected to and carried by said leaf spring for limited reciprocal movement therewith under the influence of upward pressure on said wheel when said arms are in their operative position,
B. an axle mounted on said axle support adjacent its outer end, said wheel being rotatably mounted on said axle.

4. An assembly according to claim 3, characterized by
A. a bracket fixed to the outer end of said axle support and including an aperture adapted to receive said spring and to connect said spring and said axle support,
B. said spring being slidable through said aperture to permit limited axial displacement thereof relative to said bracket during flexure of said spring.

5. A vehicle according to claim 1, characterized by
A. said first support being positioned rearwardly in said compartment adjacent its upper surface,
B. said second support being positioned forwardly in said compartment below said first support,
C. said first arm
  1. when in its inoperative position extending forwardly in said compartment substantially horizontally from said first support, and
  2. when rotated to its operative position depending substantially vertically from said support,
D. said second arm projecting rearwardly in said compartment and being biased
  1. downwardly when in said operative position and
  2. upwardly when in said inoperative position, and
E. stop means fixed in said compartment and spaced below said first support to engage said first arm and restrain said first arm from movement beyond its operative position under the influence of vertical pressure transmitted thereto from said second arm through said wedged link.

6. A vehicle according to claim 5, characterized by
A. said second arm including
  1. said axle support, the inner end of said axle support being journaled on said second support,
  2. a resilient section comprising a leaf spring disposed below said axle support and provided on its outer end with one of said pivots journaled with said link,
  3. a connector extending between and coupling the inner ends of said leaf spring and said axle support, and
  4. a bracket depending from the outer end of said axle support and provided with an aperture slidingly receiving the center section of said leaf spring,
B. said leaf spring being flexible in a direction substantially perpendicular to the longitudinal axis of said second arm to permit limited reciprocal movement of said wheel assembly when said assembly is extended and subjected to shock and variations in load pressure.

7. A vehicle according to claim 1, characterized by
A. a lever having one end pivoted on the inner side of said first arm intermediate its ends, said lever being rotatable
  1. between an erect position disposed substantially perpendicular to said arm and
  2. a folded position disposed against said arm,
B. a transversely flexible but longitudinally inelastic spacer connected to said link and the outer end of said lever,
C. said spacer being shifted by said link to move said lever from its folded to its erect position in response to movement of said arms from their inoperative to their operative positions,
D. a mount carried by said first arm on its inner side adjacent its inner end, and
E. a tensioned coil spring connected at one end to said mount and at the other end to said spacer and said outer end of said lever,
F. said coil spring
  1. moving said link from said erect to said folded position in response to movement of said arms from their operative to their inoperative position,
G. erection of said lever biasing the connected ends of said coil spring and spacer away from said first arm,
H. the energy provided by said tensioned and biased coil spring acting through said erect lever to move said first arm into its operative position engaging said stop means from an intermediate position wherein the longitudinal axes of said first arm and said link are substantially aligned.

8. A vehicle according to claim 7, wherein said stop means is characterized by
A. a generally "U" shaped bracket having a back portion affixed to the wall of said compartment and spaced leg portions projecting into said compartment,
B. said leg portions being spaced apart to receive said first arm therebetween upon movement of said arm into its operative position,
C. said leg portions acting to brace said first arm against sideways movement.

9. A vehicle according to claim 7, characterized by
A. a pivot mount fixed to the wall of said compartment, said mount carrying
  1. a first cylindrical axle comprising said first support, and
  2. a second cylindrical axle spaced below said first axle at a point outside of the circular arc defined by the limits of movement of said first arm, B. a longitudinally extendable and retractable power unit having one end journaled on said second cylindrical axle and the other end journaled on the pivot connecting said first arm and said link, C. said power unit being
 1. extended when said arms are in their inoperative position and said wheel assembly is in said retracted position within said compartment and
 2. retracted when said arms are disposed in their operative position and said wheel assembly is in said extended position, and D. means located externally of said compartment for selectively actuating said power unit to extend or retract said wheel assembly.

10. In an amphibian vehicle having a hull a compartment disposed adjacent to each side of the hull and opening through the bottom thereof, a wheel movable vertically relative to each compartment between a retracted position disposed in the compartment and an extended position projecting below the hull for rolling engagement with the ground, and an assembly carrying each of the wheels, the assembly being selectively operable to simultaneously move the wheels between and maintain the wheels in their projected and extended positions, each of said assemblies being mounted within a compartment and characterized by A. a first support positioned rearwardly in said compartment adjacent its upper surface, B. a second support positioned forwardly in said compartment generally coplanar with and below said first support, C. a first arm having an inner end journaled on said first support for oscillatory movement in a vertical plane extending generally parallel to the longitudinal axis of said hull between an upper inoperative position and a lower operative position, D. said first arm
 1. when in its inoperative position extending forwardly in said compartment substantially horizontally from said first support, and
 2. when rotated to its operative position depending substantially vertically from said support, E. a second arm having an inner end journaled on said second support for oscillatory movement in said vertical plane between an upper inoperative position and a lower operative position, F. said second arm projecting rearwardly in said compartment and being biased
 1. downwardly when in said operative position and
 2. upwardly when in said inoperative position, G. an axle support provided by and movable vertically with said second arm, H. said wheel being journaled on and movable vertically with said axle support between its extended and retracted positions in response to oscillation of said second arm between its operative and inoperative positions, I. a pivot provided on the outer end of each of said arms, J. a link having its ends journaled on said pivots, said link
 1. operatively connecting said arms through said pivots to synchronize movement of said arms whereby said arms oscillate simultaneously between their operative and inoperative positions,
 2. rotating to an angular position relative to and between said arms and wedging between said pivots upon terminal movement of said arms into their operative position to restrain said arms against movement toward their inoperative position under the influence and upward pressure on said wheel, and
 3. rotating out of said wedged position upon initial movement of said arms from their operative position to permit simultaneous movement of said arms to their inoperative position, K. stop means fixed in said compartment and spaced below said first support to engage said first arm and restrain said first arm from movement beyond its operative position under the influence of vertical pressure transmitted thereto from said second arm through said wedged link, L. said arms passing through an intermediate position during their movement between said inoperative and operative positions, M. said intermediate position being defined by
 1. projection of said second arm beyond its operative position, and
 2. alignment of the longitudinal axis of said first arm with the longitudinal axis of said link, N. a lever pivoted on said first arm intermediate its ends, said lever being rotatable
 1. between an erect position disposed substantially perpendicular to said arm and
 2. a folded position disposed against said arm, O. a transversely flexible but longitudinally inelastic spacer connected to said link and the outer end of said lever, P. said spacer being shifted by said link to move said lever from its folded to its erect position in response to movement of said arms from their inoperative to their operative positions, Q. a tensioned coil spring connected to one end to said first arm and at the other end to said spacer and said outer end of said lever, R. said coil spring moving said link from said erect to said folded position in response to movement of said arms from thier operative to their inoperative position, S. erection of said lever biasing the connected ends of said coil spring and spacer away from said first arm, T. the energy provided by said tensioned and biased coil spring acting through said erect lever to move said first arm into its operative position engaging said stop means from said intermediate position, U. a pivot mount fixed within said compartment, said mounting carrying
 1. a first cylindrical axle comprising said first support, and
 2. a second cylindrical axle spaced below said first axle at a point outside of the circular arc defined by the limits of movement of said first arm, V. a longtudinally extendable and retractable power unit having one end journaled on said second cylindrical axle and the other end journaled on the pivot connecting said first arm and said link, W. said power unit being
 1. extended when said arms are in their inoperative position and said wheel assembly is in said retracted position within said compartment and
 2. retracted when said arms are disposed in their operative position and said wheel assembly is in said extended position, and X. means for selectively actuating said power unit to extend or retract said wheel assembly.

* * * * *